United States Patent
Haddad et al.

(10) Patent No.: US 10,850,633 B2
(45) Date of Patent: *Dec. 1, 2020

(54) AUTOMATED ELECTRIC VEHICLE CHARGING SYSTEM AND METHOD

(71) Applicant: INTERIM DESIGNS INC., Elizabethtown, PA (US)

(72) Inventors: Joseph C. Haddad, Elizabethtown, PA (US); Daniel B. Lysak, State College, PA (US)

(73) Assignee: INTERIM DESIGNS INC., Elizabethtown, PA (US)

( * ) Notice: Subject to any disclaimer, the term of this patent is extended or adjusted under 35 U.S.C. 154(b) by 135 days.

This patent is subject to a terminal disclaimer.

(21) Appl. No.: 16/135,541

(22) Filed: Sep. 19, 2018

(65) Prior Publication Data

US 2019/0031036 A1 Jan. 31, 2019

Related U.S. Application Data

(63) Continuation of application No. 15/011,072, filed on Jan. 29, 2016, now Pat. No. 10,106,048, which is a
(Continued)

(51) Int. Cl.
*B60L 53/37* (2019.01)
*B60L 53/35* (2019.01)
(Continued)

(52) U.S. Cl.
CPC ............... *B60L 53/37* (2019.02); *B60L 53/18* (2019.02); *B60L 53/35* (2019.02); *B60L 53/65* (2019.02); *B60L 53/665* (2019.02); *Y02T 10/7005* (2013.01); *Y02T 10/7072* (2013.01); *Y02T 10/7088* (2013.01); *Y02T 90/121* (2013.01); *Y02T 90/125* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
CPC .......... B60L 53/14; B60L 53/35; B60L 53/37; B60L 53/65; B60L 53/665; B60L 11/1816; B60L 11/1835; Y02T 10/7072; Y02T 10/7088; Y02T 90/125; Y02T 90/128
USPC .......................... 320/104, 106, 109; 382/104
See application file for complete search history.

(56) References Cited

U.S. PATENT DOCUMENTS

| 6,959,869 B2 * | 11/2005 | Tsikos | G06K 7/10594 |
| | | | 235/384 |
| 7,999,506 B1 * | 8/2011 | Hollar | B60L 53/34 |
| | | | 320/104 |

(Continued)

*Primary Examiner* — Edward Tso
*Assistant Examiner* — Aaron Piggush
(74) *Attorney, Agent, or Firm* — F. Chau & Associates, LLC

(57) ABSTRACT

A system and method for charging an electric vehicle includes identifying vehicle information corresponding to the electric vehicle based on an electronic image of the electric vehicle, retrieving from an electronically stored database a location of a charging port on the electric vehicle based on the vehicle information, and robotically moving a charging connector according to the retrieved location to engage the charging port of the electric vehicle to charge a battery.

20 Claims, 10 Drawing Sheets

Related U.S. Application Data continuation of application No. 14/487,289, filed on Sep. 16, 2014, now abandoned, which is a continuation of application No. 13/089,827, filed on Apr. 19, 2011, now Pat. No. 8,853,999.

(60) Provisional application No. 61/325,643, filed on Apr. 19, 2010, provisional application No. 61/328,411, filed on Apr. 27, 2010.

(51) Int. Cl.
*B60L 53/65* (2019.01)
*B60L 53/66* (2019.01)
*B60L 53/18* (2019.01)

(56) References Cited

U.S. PATENT DOCUMENTS

| | | | |
|---|---|---|---|
| 10,106,048 B2 * | 10/2018 | Haddad | ................ B60L 53/665 |
| 2016/0144735 A1 | 5/2016 | Haddad et al. | |

* cited by examiner

AUTOMATED ELECTRIC VEHICLE CHARGING SYSTEM AND METHOD

CROSS-REFERENCE TO RELATED PATENT APPLICATIONS

This application is a continuation application of U.S. application Ser. No. 15/011,072, filed on Jan. 29, 2016, which is a continuation application of U.S. application Ser. No. 14/487,289, filed on Sep. 16, 2014, which is a continuation application of U.S. application Ser. No. 13/089,827, filed on Apr. 19, 2011, which claims priority to and the benefit of Provisional Application Ser. No. 61/325,643, filed on Apr. 19, 2010, and Provisional Application Ser. No. 61/328,411, filed on Apr. 27, 2010, the disclosures of which are incorporated by reference herein in their entirety.

TECHNICAL FIELD

The present disclosure relates to automatically charging an electric vehicle, and more particularly, to a system and method for automatically charging an electric vehicle.

DISCUSSION OF RELATED ART

With the growing availability of electric vehicles, there will be a need for charging stations to facilitate the operator of an electric vehicle to 'fill-up' the electric charge of his vehicle. The operator may have to manually perform certain actions, including charging the vehicle, entering payment information, selecting options (e.g., fast or slow charging), or initiating and/or approving the charging operation. Although a charging station at home may be programmed to automatically charge a vehicle at night to make use of lower power rates during off-peak hours, the operator of a vehicle may wish to manually charge the vehicle during other times. For example, if a vehicle has been used for part of a day, the operator may wish to manually initiate charging during the day so that the vehicle is fully charged for use later that same day. As a result, the operator of the vehicle may have to handle a high-voltage cable or connector, which may be dangerous, especially during inclement weather.

BRIEF SUMMARY

According to an exemplary embodiment of the present disclosure, a method for charging an electric vehicle includes identifying vehicle information corresponding to the electric vehicle based on an electronic image of the electric vehicle, retrieving from an electronically stored database a location of a charging port on the electric vehicle based on the vehicle information, and robotically moving a charging connector according to the retrieved location to engage the charging port of the electric vehicle to charge a battery.

According to an exemplary embodiment of the present disclosure, a method for charging an electric vehicle includes identifying vehicle information corresponding to the electric vehicle using a radio-frequency identification (RFID) tag mounted on the vehicle, retrieving from an electronically stored database a location of a charging port on the electric vehicle based on the vehicle information, and robotically moving a charging connector according to the retrieved location to engage the charging port of the electric vehicle to charge a battery.

According to an exemplary embodiment of the present disclosure, a system for charging an electric vehicle includes a first camera, an electronic database, a processor, and a robotic arm. The first camera is configured to acquire an electronic image of the electric vehicle. The processor is configured to identify vehicle information corresponding to the electric vehicle based on the electronic image of the electric vehicle, and retrieve from the electronic database a location of a charging port on the electric vehicle based on the vehicle information. The robotic arm is configured to move a charging connector according to the retrieved location to engage the charging port of the electric vehicle to charge a battery.

According to an exemplary embodiment of the present disclosure, a system for charging an electric vehicle includes a radio-frequency identification (RFID) reader, an electronic database, a processor, and a robotic arm. The RFID reader is configured to identify vehicle information corresponding to the electric vehicle using an RFID tag mounted on the electric vehicle. The processor is configured to retrieve from the electronic database a location of a charging port on the electric vehicle based on the vehicle information. The robotic arm is configured to move the charging connector according to the retrieved location to engage the charging port of the electric vehicle to charge a battery.

According to an exemplary embodiment of the present disclosure, a method for charging an electric vehicle includes acquiring a plurality of images of a field of view while in a vacant state, detecting whether the electric vehicle has entered the field of view based on an analysis of the plurality of images while in the vacant state, initiating a tracking state upon detecting that the electric vehicle has entered the field of view, tracking a position and pose of the electric vehicle while the electric vehicle is in motion based on a plurality of features of the electric vehicle extracted from each image while in the tracking state, initiating an identify state upon detecting that the electric vehicle is no longer in motion, identifying a matching vehicle model candidate in a database using the position and pose of the electric vehicle in each image while in the identify state, initiating a connect state upon identifying a matching vehicle model candidate, verifying whether a charging port on the electric vehicle is in an expected location based on a most recently acquired image while in the connect state, and engaging a charging connector into the charging port upon verifying that the charging port is in the expected location while in the connect state.

BRIEF DESCRIPTION OF THE SEVERAL VIEWS OF THE DRAWINGS

The above and other features of the present disclosure will become more apparent by describing in detail exemplary embodiments thereof with reference to the accompanying drawings, in which.

DETAILED DESCRIPTION

Figure 1:
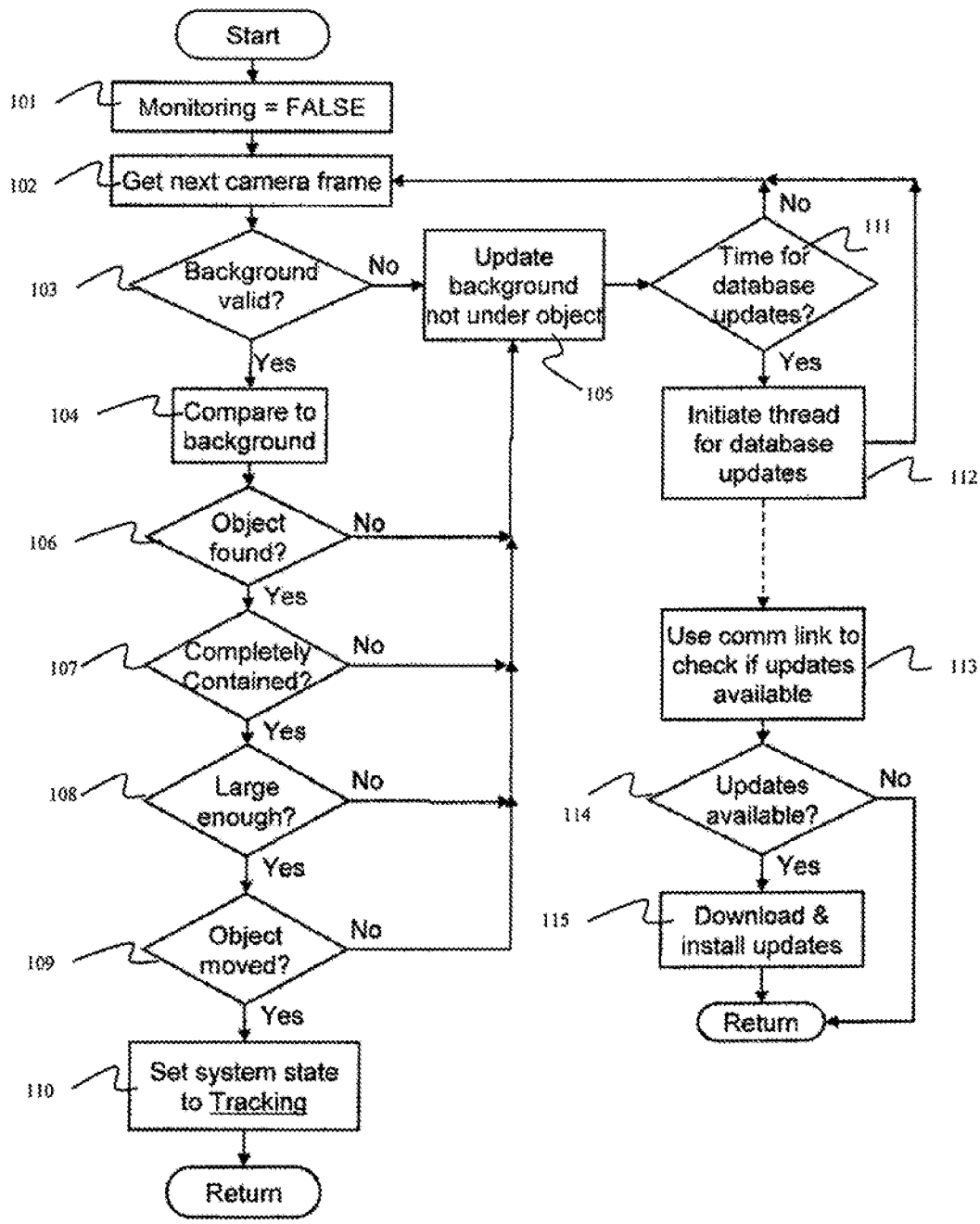
FIG. 1 is a flowchart showing the operation of a vacant state software module, according to an exemplary embodiment.

Exemplary embodiments of the present disclosure will be described more fully hereinafter with reference to the accompanying drawings. Like reference numerals may refer to like elements throughout the accompanying drawings.

System Components

An exemplary embodiment of an automated electrical vehicle charging system may include a processor, a camera and an associated computer interface board (e.g., a frame grabber), a charging cable and a charging connector, and a robotic arm. The electric vehicle charging station may automatically connect to a vehicle and charge the vehicle without the need for operator action. The charging station may operate without the user having to precisely align the vehicle at the charging station, and without any specialized modifications or equipment installations made to the vehicle. For example, when a vehicle is driven up to and parked near the charging station, the charging system may recognize that the vehicle is present, identify information about the vehicle (e.g., the make, model and year of the vehicle), and determine the location of the vehicle's charging port using this information. The charging system may then automatically establish a connection with the vehicle's charging port and initiate the charging process. The charging system may utilize different charging voltages and currents, and various types of electrical connectors. Once charging is complete, the charging system may disengage the connection and monitor the vehicle to determine when it has left the charging system, allowing another vehicle to be charged.

According to an exemplary embodiment, an automated electrical vehicle charging system uses a camera to continuously monitor the space where a vehicle is to be parked for charging. The camera analyzes the image frames to identify when a vehicle moves into the camera field of view. When a vehicle is found, a sequence of images is used to track the vehicle until it is parked, and those images are used to identify information about the vehicle such as, for example, the vehicle's make, model and year. A database of three dimensional (3D) mathematical models for different vehicles and their corresponding make, model and year is compared to the camera images, similarity scores are calculated, and a vehicle having the highest similarity score is selected.

Once the make, model and year of the vehicle are determined, the location of the vehicle's charging port is obtained from a look-up in the vehicle database. The location of the charging port may be verified from the camera image of the parked vehicle, and a robotic arm may carry a charging cable with a charging connector to the vehicle's charging port, using a real-time sequence of camera images for guidance. The robotic arm may open a door covering the charging port, if present, before plugging in the charging connector. Once the charging connector is engaged in the charging port, the charging system initiates and monitors the charging process. When the charging system senses that charging is complete, the robotic arm disengages the charging connector and returns to its home position. The charging system continues to monitor and track the vehicle to determine when it has left the charging station. Once the vehicle has left the charging station, the camera monitors the space to determine when another vehicle has arrived.

The processor operates continuously and executes various software functions and controls the actions performed by the components of the charging system. The processor may be part of an embedded computer that oversees the operation of the entire charging system, including the acquisition of the camera images and control of the robotic arm, and performs the computations for image analysis and vehicle tracking and identification. The processor executes the software that performs the various functions of the charging system. The embedded computer may be based on an Intel® S5520SC workstation motherboard with an Intel® Xeon® 5500 series quad core processor operating at about 3.3 GHz, however, as will be appreciated by one having ordinary skill in the art, the embedded computer is not limited thereto. Utilization of multiple processor cores in the embedded computer allows the image processing functions, the robotic arm control, and other functions to be concurrently active without competing for processor resources (e.g., when the camera images are being used to guide the charging connector into the vehicle charging port). The embedded computer may include a vision processor board such as, for example, a Matrox® Odyssey Xpro+ scalable vision processor board, which includes a PowerPC® G4 processor with a customizable Field Programmable Gate Array (FPGA) co-processor. The vision processor board provides highly parallel execution of many image operations such as, for example, filtering, motion detection, and matrix processing. Utilization of the vision processor board takes a portion of the computational load off of the main processors.

The vision processor board may be configured with a Camera Link single-camera full-configuration frame grabber mezzanine, which provides the interface to the camera. The Camera Link frame grabber handles the acquisition of images from the camera, and its interface provides for control of many camera operating parameters such as, for example, the frame rate and shutter speed. The interface can also be used to trigger the shutter. The shutter speed may be adjusted to compensate for changes in light levels, and to keep the images within an acceptable brightness range without being saturated.

The charging system may further include communication devices capable of sending and receiving messages to other computers or devices. The communication devices may operate via wires or wirelessly, and may connect to the Internet using the TCP/IP protocol. The communication devices may be used, for example, to download updates to the vehicle database, and/or to validate billing information with a remote accounting system.

The camera may be used to acquire images of a charging space at the charging station where the vehicle is to be parked during charging. The acquired images are used for vehicle tracking and identification, as well as to guide the robotic arm as it engages the charging connector into the charging port. The camera may be, for example, a monochrome, progressive scan charge-couple device (CCD) camera with 1600×1200 square pixels and the Camera Link interface, such as, for example, a Sony® XCL-U1000.

However, as will be appreciated by one having ordinary skill in the art, the camera is not limited thereto. The camera may be a high-sensitivity camera (e.g., 400 lux at f/5.6) with shutter speeds of about 10 μsec, and may be operated at a frame rate of about 5 Hz to about 15 Hz, however, the camera is not limited thereto. The camera acquires images continuously, and the frame grabber places the images into a multi-frame buffer, which allows the software to process the most recent image while the next image is being acquired. The camera may be mounted in a fixed position and have a fixed viewing direction, such that the side of the vehicle including the charging port is visible when the vehicle is parked in the charging space, and the front of the vehicle is visible at some point during the parking process. A moderately wide angle lens may be used, such that entire charging station and the vehicle are within the field of view when the vehicle is parked for charging.

In an exemplary embodiment, an additional camera may be mounted on the robotic arm. The additional camera may acquire images which are used to verify the location of the charging port on the vehicle and guide the robotic arm as it engages the charging connector into the charging port. The additional camera may have a lower resolution than the main camera used to monitor the vehicle. For example, the additional camera may be a monochrome progressive scan CCD camera with 640×480 square pixels and the Camera Link interface, such as, for example, a Sony® XCL-V500. However, as will be appreciated by one having ordinary skill in the art, the additional camera is not limited thereto. The additional camera may be mounted in a fixed position on the robotic arm such that the charging connector and the charging port on the vehicle are both within the field of view. Utilization of the additional camera allows the vehicle to be parked at the charging station in a position where the charging port is not visible from the main camera.

The charging cable and the charging connector mate with the vehicle's charging port and supplies the charging voltage and current to the vehicle. The charging cable and charging connector also carry any signal lines associated with the connection. Various types of cables and connectors may be used to charge the vehicle. The charging connector is attached to the robotic arm, and the robotic arm engages the charging connector into the charging port. The charging connector may engage the charging port via various means. For example, the charging connector may be pushed straight into the charging port, and an actuator attached to the robotic arm may be used to twist the charging connector into place once it has been pushed into the charging port.

Connectors used in the charging system may be conductively coupled (e.g., directly coupled) or inductively coupled (e.g., magnetically coupled). When the connectors are conductively coupled, direct contact is made between the conductors, and the supplied voltage may be either an AC voltage or a DC voltage. When the supplied voltage is an AC voltage, a charger/regulator may be located on the charging station or on the vehicle, and may be used to convert the AC voltage to a DC voltage and to regulate the voltage and/or current as the battery is being charged. Disposing the charger/regulator on the vehicle allows the vehicle to be charged at multiple locations. When the supplied voltage is a DC voltage, a charger for voltage and current regulation may be located on the charging station. When the connectors are inductively coupled, the supplied voltage may be an AC voltage, and the conductors may be enclosed and impervious to water. In a charging system using inductively coupled connectors, grid power is first converted to a higher frequency to improve efficiency and to allow for reasonably sized connectors.

The charging cable and charging connector may be compliant with the SAE J1772 standard, which is a U.S. standard for electrical vehicle connectors maintained by the Society of Automotive Engineers. The charging cable and charging connector may be compliant with various revisions of the SAE J1772 standard including, but not limited to older revisions (e.g., the Avcon standard) and newer revisions (e.g., the January, 2010 revision). For example, the charging connector may be a round connector about 43 mm in diameter and may contain five pins, as defined in the January, 2010 revision. The five pins are AC Line 1, AC Line 2/Neutral, Ground, Proximity Detection, and Control Pilot. According to the standard, the Proximity Detection line prevents movement of the car while the charging connector is attached, and the Control Pilot line facilitates communication for coordinating the charging level between the vehicle and the charger, as well as other information. The standard further provides safety, particularly in wet weather, by isolating the connection pins on the interior of the connector with no physical access when mated, and ensuring that there is no voltage on the pins when not mated. The standard defines two charging levels depending on whether pin 2 is used as an AC line for 240 V or Neutral for 120 V:

AC Level 1: 120 V, single phase, 16 A, (1.9 kW)
AC Level 2: 240 V, single phase, 80 A, (19.2 kW)

An example of a connector based on the January 2010 revision is manufactured by Yazaki. Other connectors are being developed by Mennekes and are expected to be included under the IEC 62196 electric vehicle standard. These connectors use three-phase AC and are capable of charging at rates used for fast charging.

For purposes of the present disclosure, it is assumed that existing charging stations monitor any signal wires present in the charging connector. For example, signal wires indicating whether a valid connection has been established, the charging level, and other status information may be used to make this information available to the charging station through a digital input. Similarly, it is assumed that an existing charging station is turned on or off via a switch or a relay controlled by the embedded computer of the present disclosure, and that any voltage or current issues may be handled by existing equipment.

The robotic arm is used to hold the charging cable and the charging connector, and to engage the charging connector into the vehicle's charging port. The robotic arm may be, for example, a six-axis arm with a reach of about 2 meters and a payload capability of about 10 kg, such as, for example, a model M-20iA/10L manufactured by FANUC® Robotics. However, as will be appreciated by one having ordinary skill in the art, the robotic arm is not limited thereto. In an exemplary embodiment, an additional camera used to verify the location of the charging port and guide the robotic arm as it engages the charging connector into the charging port may be mounted on the robotic arm. Further, an actuator used to open a cover or door on the charging port, if present, may be attached to the robotic arm.

In an exemplary embodiment, the charging station may include an RFID reader. RFID is often used for inventory control in retail stores, and is an accepted method for paying by credit card at gas stations and other establishments. The RFID reader may read an RFID tag mounted on the vehicle to identify information relating to the vehicle such as, for example, the make, model and year of the vehicle. The RFID reader may further be used to provide customer billing information for the charging transaction. The RFID reader may be a commercial embedded RFID reader such as, for example, a SkyeModule™ M10 manufactured by Skyetek®, which has a range of about 5 meters, however, the RFID reader is not limited thereto. The RFID reader may be used in place of, or in conjunction with, the computer vision software techniques described herein to identify the make, model and year of the vehicle. Exemplary embodiments may take the cost of each implementation (e.g., the cost of the RFID reader compared to the incremental cost of the added computational power used to perform the described computer vision software techniques) into consideration when determining which implementation to utilize. The RFID reader may further be used to provide billing information for the charging transaction. When RFID is utilized, a camera may still be used to track the position and pose of the vehicle, allowing for the determination of the location of the vehicle's charging port with respect to the charging station.

In an exemplary embodiment, an energy storage device may be used to provide for fast charging of the vehicle at power rates beyond the capability of the connection to the local power grid to the charging station. For example, the energy storage device may be a battery similar to the 26 kWh lithium-ion battery used in the Nissan® Leaf™, however, the energy storage device is not limited thereto. Utilization of an energy storage device allows the charging system to provide fast charging without the need for special wiring.

Exemplary embodiments may further include other components that are used in existing charging stations such as, for example, power cables and connectors of various types, voltage/current regulators, and credit card readers.

Vehicle Tracking and Recognition, and Software Architecture

The process of tracking a vehicle to determine when it has entered the charging station, and identifying information about the vehicle such as, for example, the make, model and year of the vehicle, is based on a structure-from-motion algorithm, in which a sequence of two-dimensional (2D) camera images of the moving vehicle are analyzed to construct a 3D structure, including the pose of the vehicle. An example of a structure-from-motion algorithm is described in Prokaj, J., Medioni, G., 3-*D Model Based Vehicle Recognition*, IEEE Workshop on Applications of Computer Vision (2009), and Hartley, R., Zisserman, A., *Multiple View Geometry in Computer Vision*, Cambridge University Press (2003). In an exemplary embodiment, a single camera mounted in a fixed position captures the images as the vehicle is driven into the charging space. As the vehicle moves, it appears in a different position and presents a different pose to the camera in each image frame. When tracking the vehicle, feature points on the vehicle, which appears as a rigid body, follow different trajectories as a result of the perspective projection of the 3D object (e.g., the vehicle) onto the camera image plane. Feature points between different frames may be matched and a system of equations may be generated. Solution of the equations results in a 3D structure corresponding to the vehicle.

This analysis is similar to a stereo vision system, where images of a stationary object are captured from different viewing angles to provide depth information that is lacking in any one image. In an exemplary embodiment, the viewpoint and viewing direction of each image with respect to the vehicle coordinate frame are not known in advance, and are obtained using the solution of the system of equations described above. Further, a relatively large number of image frames may be used, and the frames may be acquired at a rate that is sufficient to make the distance that the vehicle travels between successive frames relatively small, and the motion relatively smooth. As a result, the identification of corresponding features in adjacent frames is improved compared to a traditional stereo vision system. This results in improved reliability when recognizing whether a feature is no longer visible (e.g., a feature that is occluded in certain views).

The software used for the charging system may be built on an operating system platform that supports hard real-time processing such as, for example, Wind River Linux 3.0 with Wind River Real-Time Core for Linux from Wind River Systems, Inc., however, the software is not limited thereto. The software architecture may be organized as a set of system states, and each state may be associated with a processing module that is executed when the charging system is in that state. The system states are discussed in detail with reference to FIGS. 1 to 7.

If a module that is currently executing changes the system state, that module is exited, and the module for the new state is executed. The architecture also includes a database containing vehicle information such as, for example, the make, model, and year of different vehicles, which supports the processing modules in identifying the vehicle and locating its charging port.

The system states and the associated processing modules are described herein. The states are listed below in the order they are frequently traversed. For example, a vehicle may first be driven into the field of view of the camera, proceed through the charging process, and then leave the charging space. However, as will be appreciated by one having ordinary skill in the art, the order of the states is not limited thereto, and the states may be traversed in any order.

FIG. 1 is a flowchart showing the operation of the vacant state software module, according to an exemplary embodiment.

The vacant state is the initial or idle state of the charging system. In the vacant state, no vehicle is at or approaching the charging station. Camera images are obtained and analyzed in the vacant state to detect whether a vehicle has entered the field of view of the camera. When a vehicle is detected, the system state is set to the tracking state.

In the vacant state, when there is no vehicle in the charging space, the image frames acquired by the camera are used to estimate the background using the mode of the images over the preceding several seconds. A vehicle coming into the camera field of view is recognized using a background-subtraction motion detector technique, where the area that changes is large enough to represent a vehicle and is completely within the field of view. When a vehicle is found, the images are saved until there is no motion of the vehicle (e.g., the vehicle is parked). The motion may be paused and restarted, resulting in additional images being added to the sequence until the vehicle stops again.

Referring to FIG. 1, when the system is in the vacant state, no vehicle has been detected at the charging station, and no vehicle has been detected approaching the charging station. In the vacant state, each camera frame is processed as it is acquired to determine whether a moving vehicle is present. For example, if the system is not currently monitoring a moving vehicle (block 101), the next camera frame is obtained (block 102). Background subtraction is used to detect whether an object is present (blocks 103-105). If an object is detected (block 106), the blob of pixels representing the object is monitored. If the object is completely contained within the field of view (e.g., no part of the object is at edges of the image) (block 107), is large enough to be a vehicle (block 108), and is moving (e.g., compared to the previous frame) (block 109), the system state is set to the tracking state (block 110). If an object is not found (block 106), is not completely contained within the field of view (block 107), is not large enough to be a vehicle (block 108), or is not moving (block 109), the background is updated (block 105), and it is determined whether the database should be checked for updates (block 111). If it is not time to check for updates, the next camera frame is obtained (block 102). If it is time to check for updates, a thread is initiated which sends a message via the communication link to determine whether updates to the database are available (blocks 112, 113). The thread may execute at a low priority in a background mode. If updates are available, they are downloaded and automatically installed (blocks 114, 115).

Figure 2A:
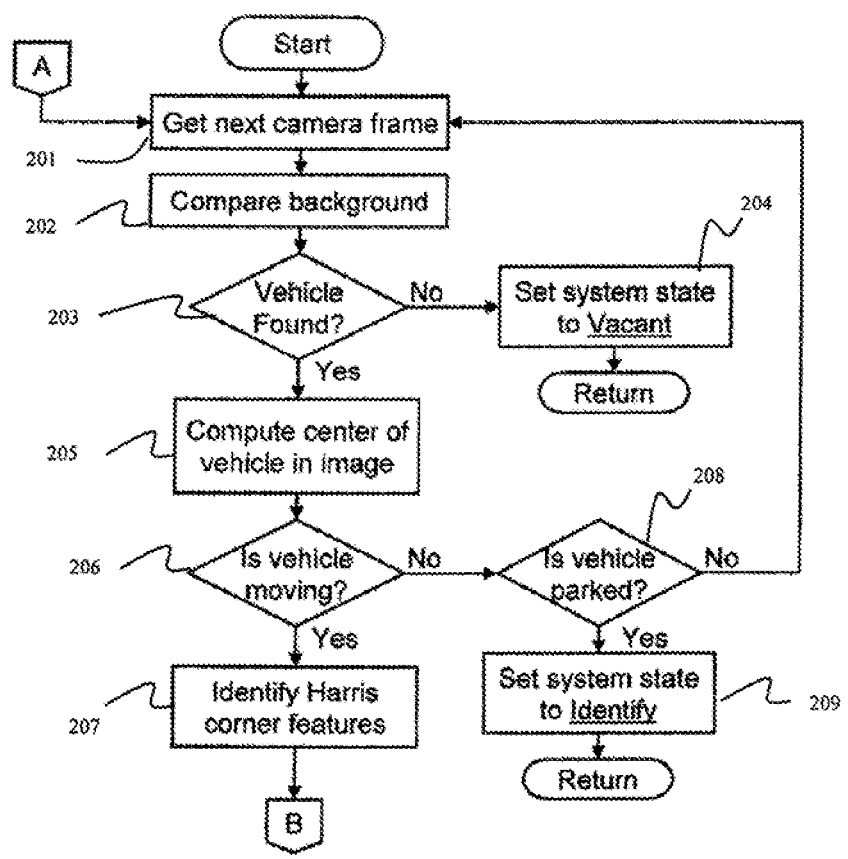
FIGS. 2A-2B are a flowchart showing the operation of a tracking state software module, according to an exemplary embodiment.
Figure 2B:
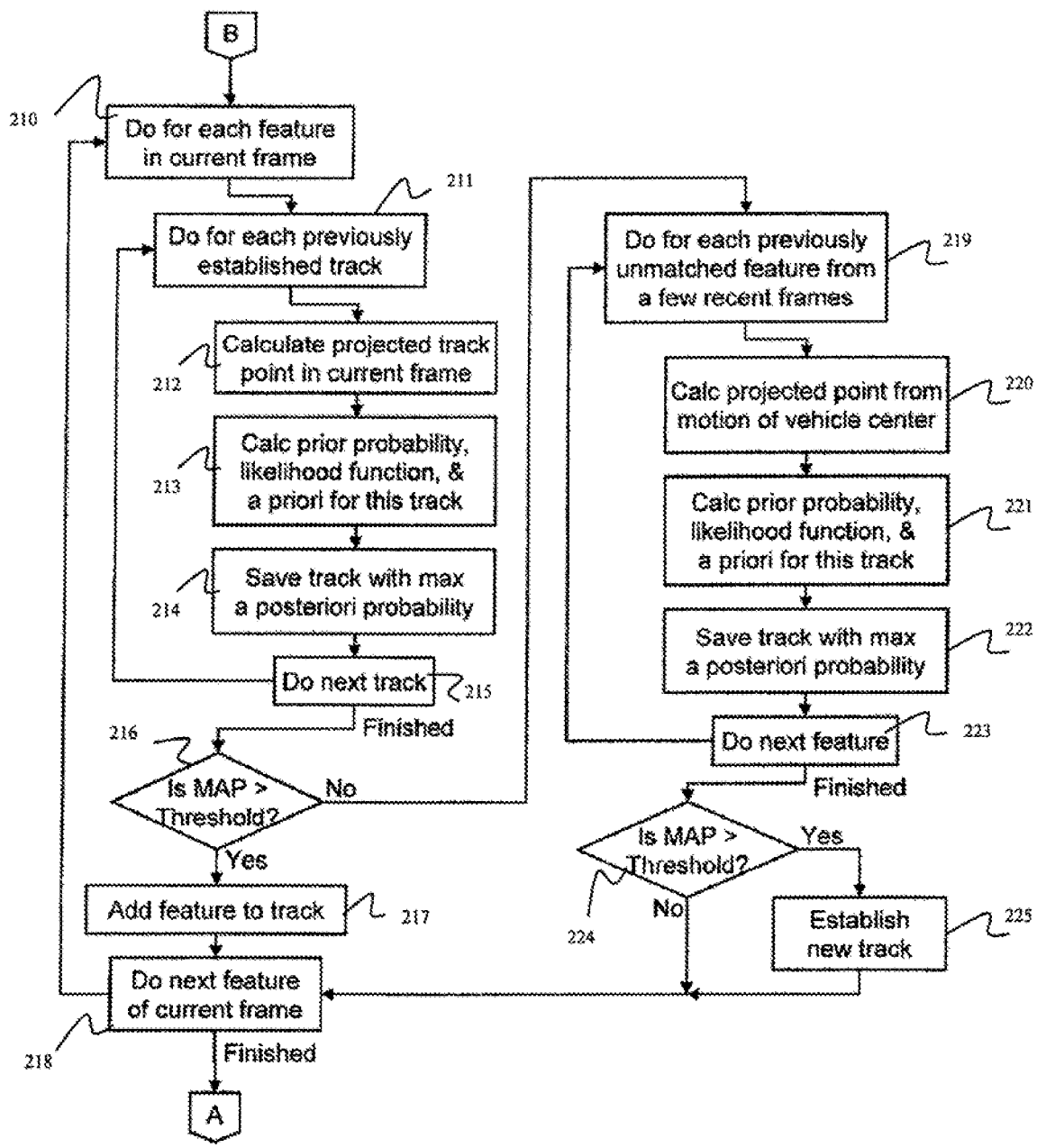

FIGS. 2A-2B are a flowchart showing the operation of the tracking state software module, according to an exemplary embodiment.

In the tracking state, the trajectory of the vehicle is tracked from frame to frame. Features are identified on the vehicle and compared with features from previous frames to establish a track for the features. The data for each camera frame is saved for subsequent further processing. Once the vehicle has been parked, the system state is set to the identify state.

Referring to FIGS. 2A-2B, as each frame is acquired by the camera (block 201), pre-processing is performed on the frame to provide preliminary analysis of the vehicle motion, and to identify and track the feature points used by the structure-from-motion algorithm. Background subtraction is used to detect whether the vehicle is present (blocks 202, 203). If the vehicle is not found, or if the vehicle was previously found but has exited the field of view, the system state is set to the vacant state (block 204). If the vehicle is found, the center of the vehicle in the image is computed (block 205), and the blob of pixels representing the vehicle is compared with the previous frame to determine whether the vehicle is still moving (block 206). If the vehicle has not moved for a certain period of time, the vehicle is considered to be parked, and the system state is set to the identify state (blocks 208, 209). If the module has not switched to a new state, the feature matching and tracking processing for the current image frame is performed.

Corner detection may be used to extract features in each frame for tracking the vehicle motion and for identifying the make, model and year of the vehicle (block 207). For example, a Harris corner detector may be used. An example of a Harris corner detector may be found in Harris, C., Stephens, M. J., *A Combined Corner and Edge Detector*, Proceedings, Alvey Vision Conference pp. 147-152 (1988). The Harris corner detector is based on the local autocorrelation matrix, whose eigenvalues represent a measure of the change in intensity in the two principal directions defined by the eigenvectors. If both eigenvalues are small, there is little change in any direction (e.g., the intensity is nearly constant over that part of the image). If one eigenvalue is large while the other is small, it indicates an edge perpendicular to the first eigenvector. If both eigenvalues are large, it indicates a corner. The threshold may be set so that a moderately sparse set of corner features is extracted. Once candidate features are identified using, for example, the Harris corner detector (block 207), each one is compared for correspondence with features and tracks from previous frames using a feature matching technique, as shown in FIG. 2B.

If a feature in the current frame matches a previously established feature track, it is added to that track. Since the camera frame rate is selected to keep the apparent motion small from one frame to the next, and because the vehicle is physically constrained by the wheels on the ground plane, the vehicle trajectory and any feature tracks are smooth. Features are matched across image frames using, for example, a Bayesian maximum a posteriori (MAP) technique to find the feature in the current frame that best matches a feature in a previous frame. Once a match is found, a track is established, identifying the relationship between the features and their positions in their corresponding frames. Features in the current frame are also tested against previously established tracks and are added to the track if a match is found. For example, the search for matches starts by projecting each track found in previous frames (block 211) to estimate the position where the feature would be located in the current frame (block 212). The Bayesian prior probability is taken as a circular distribution centered at that location, decreasing with distance, from a maximum at the center out to a radius of about 1.5 times the apparent motion from the last frame of the track. The likelihood function is calculated as a normalized cross-correlation between features in the two frames (block 213), and the feature in the current frame with the maximum a posteriori probability (block 214), above a certain threshold (block 216), is selected as the match and added to the track (block 217). This is done for each track (block 215), and for each feature in the current frame (blocks 210, 218).

If no matching track is found, it is compared to features in previous frames, and if a match is found, a new track is created. The data generated for each camera frame is saved for subsequent further processing. That is, after all previous tracks have been examined, any unmatched features from the previous few frames are examined for matching with features in the current frame (block 219). The process is similar to the process used for tracks, except that the center of the prior distribution is estimated from the feature location in the previous frame projected by the motion of the center of the blob of vehicle pixels from the previous frame to the current frame (blocks 220, 221). The feature in the current frame with the maximum a posteriori probability (block 222), above a certain threshold (block 224), is selected as the match, and a new track is established (block 225) by doing this for each feature (block 223). Any features in the current frame that are not used in a track remain unmatched.

Figure 3:
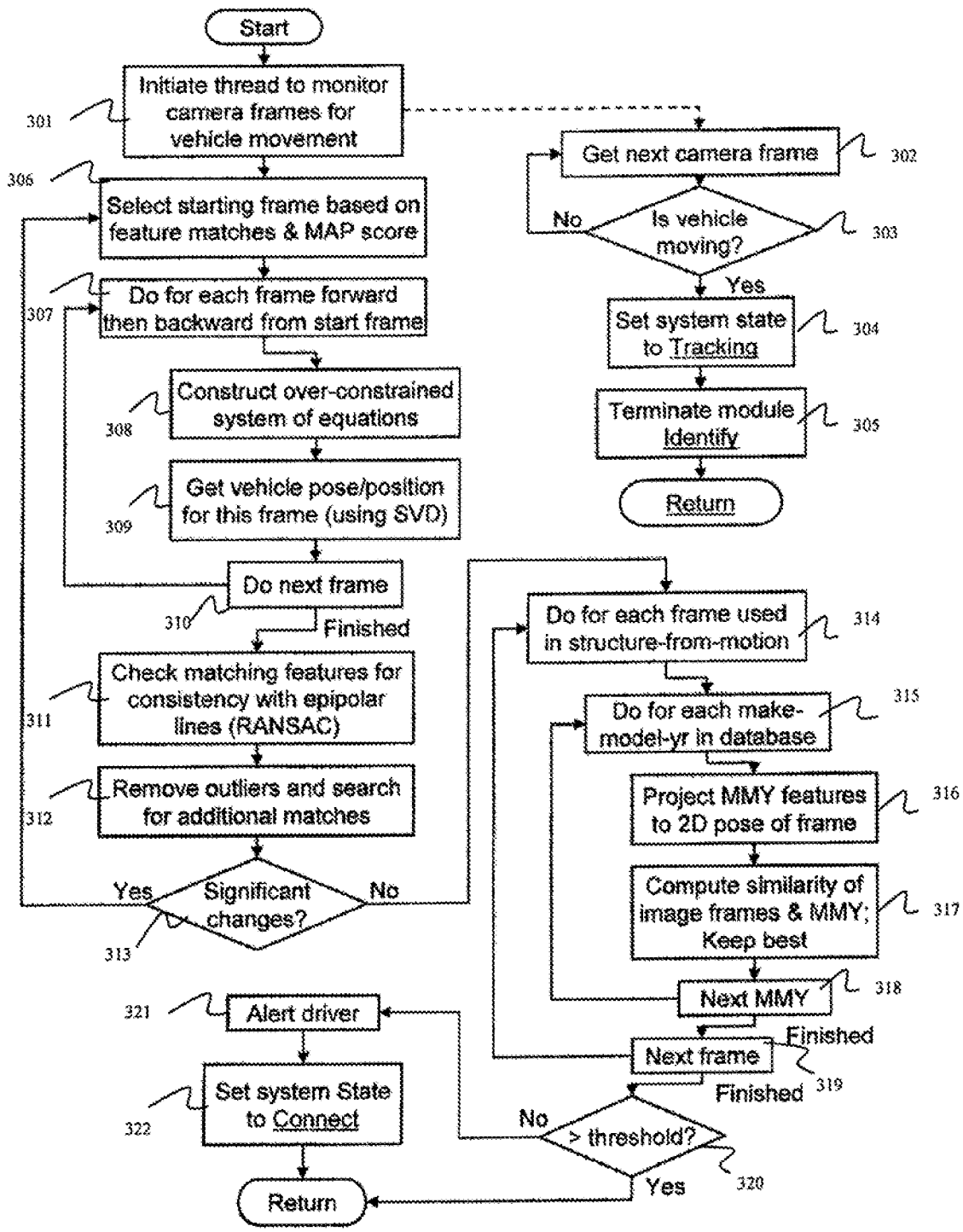
FIG. 3 is a flowchart showing the operation of an identify state software module, according to an exemplary embodiment.

FIG. 3 is a flowchart showing the operation of the identify state software module, according to an exemplary embodiment.

In the identify state, the feature matching/tracking results saved for each frame in a structure-from-motion algorithm are applied to determine the position and pose of the vehicle in each frame. The vehicle database is then searched to find the best match of pose-corrected features in the database with the frame data. Once the best match is determined, the system state is set to the connect state.

Once the structure-from-motion algorithm obtains the position and pose of the vehicle as seen in each of the camera frames, the position and pose are used to identify the make, model and year of the vehicle. The position and pose of the vehicle are used to match the feature information extracted in each frame with the 3D models in the vehicle database. Each 3D vehicle model may be translated and rotated to match the pose of the vehicle in the frame, converted to a 2D image, and matched with the 2D features seen in the frame. As a result, the search may be performed in 2D rather than 3D, which may reduce the search requirements.

Referring to FIG. 3, a motion detector algorithm is used to test each frame as it is acquired by the camera determine whether the vehicle is moving again (blocks 301, 302). If the vehicle is moving, the system state is set to the tracking state (block 304), where the system continues to track the vehicle and its feature points, and the identify state is exited (block 305).

If the vehicle is not moving, the structure-from-motion algorithm is used to determine the position and pose of the vehicle for each frame collected in the tracking state. For example, once feature correspondence between frames has been established, a starting frame is selected based on the number and quality of matching features with other frames (block 306). A second frame, moving forward in the sequence, is then chosen (block 307), and those features that match the first frame are used to generate a system of linear equations (block 308) which may be used to obtain the change in position and pose of the vehicle relative to the first frame (block 309). The second frame is chosen both for its matching features with the first frame, and for the apparent motion of those features from the first frame (block 310). While the camera frame rate is selected to keep the apparent motion small from one frame to the next for accurate feature tracking, the use of frames with small apparent motion may enhance noise in the solution of the equations. For motion reconstruction, the frame is selected so that the apparent motion produces a well formed set of equations that can be solved with minimal noise. The process repeats incrementally, choosing a next frame and computing the vehicle position and pose, until the end of the frame sequence is reached (blocks 307-310). The process is again repeated, working back from the starting frame to the beginning of the frame sequence. At this point, the position and pose of the vehicle in each computed frame are known with respect to the starting frame. The position and pose are related to the charging station coordinate system, or the camera coordinate system, by modeling the vehicle to have fixed rear wheels with rotation around the vertical axis at the center of the rear axel and fitting the vehicle trajectory through the computed position and pose data points.

The change in position and pose from one frame to the next is calculated by solving for F, the fundamental matrix of the epipolar geometry relating the two frames [see, for example, Hartley, R., Zisserman, A., *Multiple View Geometry in Computer Vision*, Cambridge University Press (2003)]. F is a 3×3 matrix of rank 2 that can be constructed from eight parameters, including the translation and rotation of the vehicle between the frames. The equations are generated using the equation $x'^T F x=0$, where:

x is a 3×1 matrix containing the coordinates of a feature point in the image plane of the first frame, and $x'^T$ is the transpose of the 3×1 matrix containing the coordinates of the corresponding feature point in the second frame.

Each pair of matching feature points produces one equation to solve for the eight variables, with one additional constraint that the vehicle motion is confined to the ground plane. Each pair of frames has at least seven matching features. The over-constrained problem is solved in a straight forward manner using, for example, Singular Value Decomposition (SVD). Once a solution is found, the feature correspondences are checked to determine that they are on or near their epipolar lines [see, for example, Hartley, R., Zisserman, A., Multiple View Geometry in Computer Vision, Cambridge University Press (2003)]. The check for outliers may be done on a statistical basis using, for example, the RANSAC algorithm [see, for example, Fischler, M., Bolles, R., *RANdom SAmpling Consensus: a Paradigm for Model Fitting with Application to Image Analysis and Automated Cartography*, Commun. Assoc. Comp. Mach., 24:381-395 (1981)] (block 311). Outliers are removed and the solution is used to guide the search for additional correspondences (block 312). The computations used to determine the vehicle position and pose are repeated.

When it is determined that there are no more significant changes (block 313), the vehicle database is searched for a model of a vehicle having the best matching make, model and year. In performing the search, a similarity figure of merit is accumulated over all camera frames used in the structure-from-motion algorithm. For each frame (block 314), each 3D model in the database is rotated to the vehicle pose for that frame, and the 3D model features are projected onto the 2D plane corresponding to the camera image plane (block 316). The similarity factors are then computed in 2D (block 317). This process is repeated for each frame used in the structure-from-motion algorithm (blocks 314, 319), and for each make, model and year in the database (blocks 315, 318). When finished, the system state is set to connect state (block 322). If no valid match is found, the vehicle operator is alerted to enter the make, model and year manually (e.g., via a keypad) (block 321).

Figure 4:
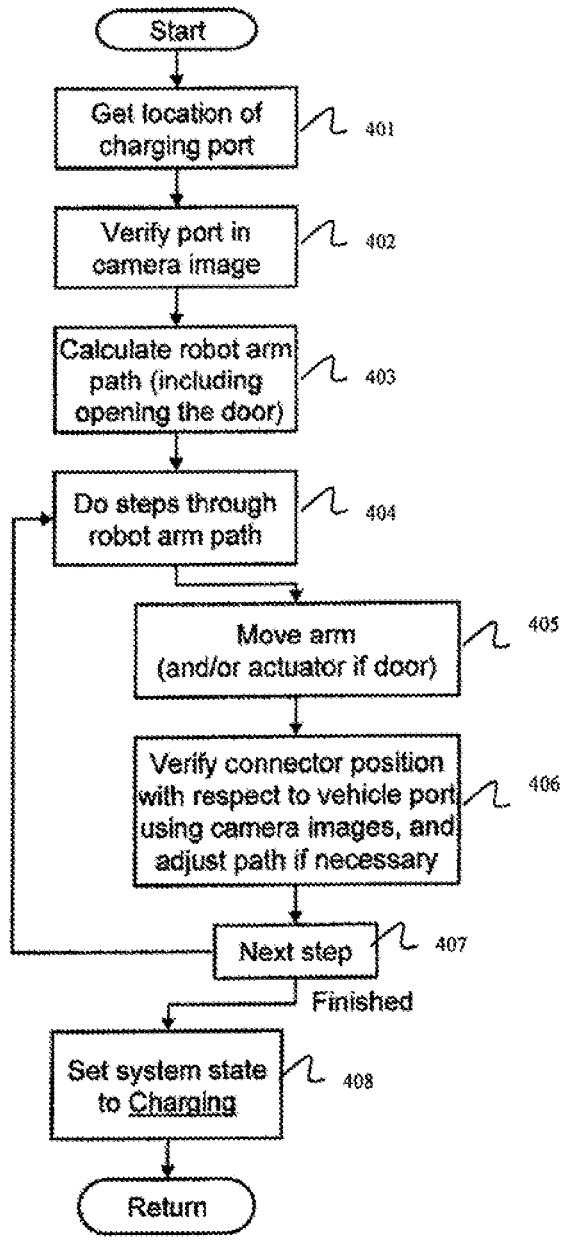
FIG. 4 is a flowchart showing the operation of a connect state software module, according to an exemplary embodiment.

FIG. 4 is a flowchart showing the operation of the connect state software module, according to an exemplary embodiment.

In the connect state, it is first verified whether the vehicle charging port is in its expected location and is accessible. Camera images are then used to direct the robotic arm towards the charging port. Charging protocols, including, for example, a fast charge protocol, are verified. Once completed, the system state is set to the charging state.

Referring to FIG. 4, the location of the vehicle charging port is obtained from the vehicle database, along with information about the direction from which the charging connector is to be inserted (block 401). The latest camera frame is analyzed to validate the location of the charging port and to verify that the charging port is within the range of the robotic arm carrying the charging connector (block 402). Since the position and pose of the charging port are known to a good approximation, and since the 3D model can be rotated, translated and scaled to match the pose and position of the charging port, the search space is small, and correlation may be used to identify the charging port. A path is then calculated for the robotic arm to insert the charging connector into the charging port, providing for proper direction as the charging connector engages the charging port (block 403). If a cover or door covers the charging port, the robotic arm may open the cover or door. The robotic arm is then directed to move along the calculated path. While moving along the path, camera frames are analyzed to accurately determine the relative position of the charging port and the charging connector, and to make adjustments to the position of the charging connector on the robotic arm as it approaches the charging port (blocks 405-407). The camera frames may be analyzed, for example, using a correlation technique as described above. Once the charging connector has been inserted into the charging port, the system state is set to the charging state (block 408). In an exemplary embodiment, an additional camera may be mounted on the robotic arm to guide the charging connector into the charging port. Steps similar to those described in reference to FIG. 4 may be used in conjunction with the additional camera. In this embodiment, the charging connector appears stationary in the camera image and the charging port on the vehicle appears to move.

Figure 5:
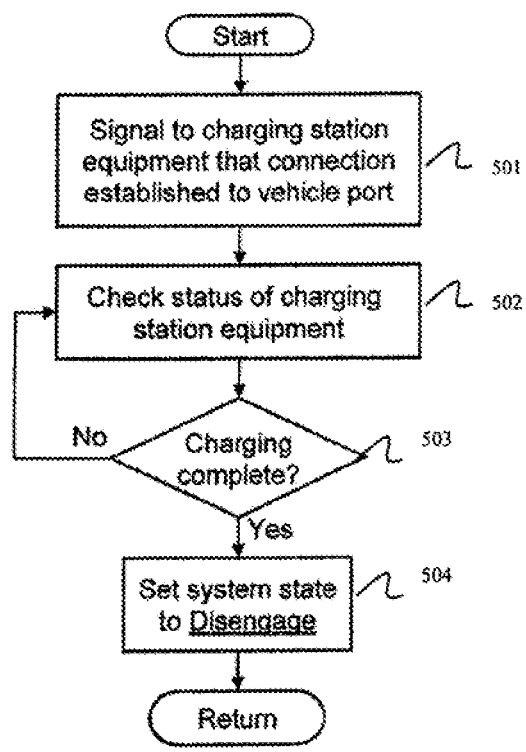
FIG. 5 is a flowchart showing the operation of a charging state software module, according to an exemplary embodiment.

FIG. 5 is a flowchart showing the operation of the charging state software module, according to an exemplary embodiment.

In the charging state, the charging process is initiated and monitored. Once the charging process is complete, charging voltage/current is turned off, and the system state is set to the disengage state.

Referring to FIG. 5, the charging system outputs a binary output such as, for example, a DC signal voltage or a relay control signal to the existing charging station equipment. The binary output indicates that the charging connector has been inserted into the charging port and that the charging voltage/current may be turned on (block 501). The monitoring of signal wires in the charging connection may be performed by the existing equipment, or by components integrated into the charging system. For example, when the monitoring of signal wires is performed by existing equipment, digital inputs in the existing equipment may be continuously monitored, and the binary output may be turned off when the existing equipment signals that charging has been completed (blocks 502, 503). The system state is then set to the disengage state (block 504).

Figure 6:
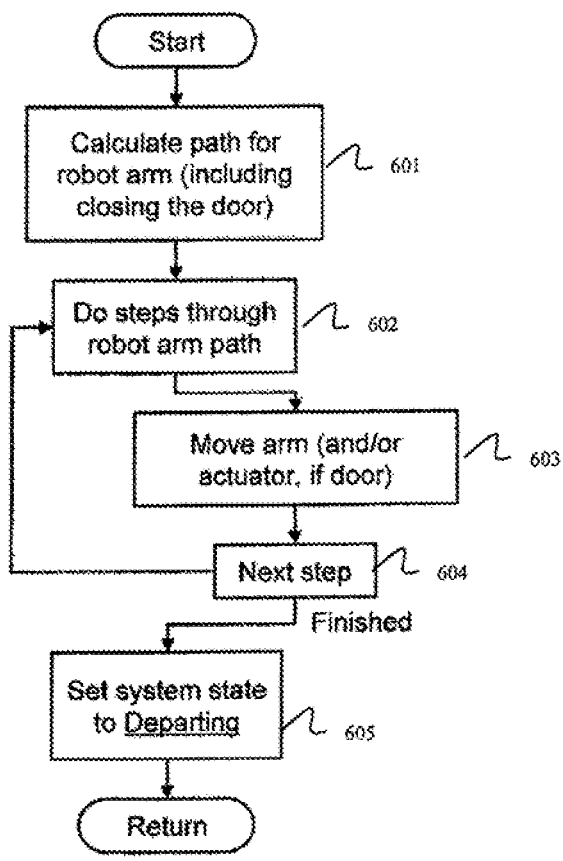
FIG. 6 is a flowchart showing the operation of a disengage state software module, according to an exemplary embodiment.

FIG. 6 is a flowchart showing the operation of the disengage state software module, according to an exemplary embodiment.

In the disengage state, the charging connector is disengaged from the vehicle's charging port, and the robotic arm is returned to its home position. Once completed, the system state is set to the departing state.

Referring to FIG. 6, a path is calculated for the robotic arm to disconnect the charging connector from the charging port and return to its home position (block 601). If a cover or door covers the charging port, the robotic arm may close the cover or door. The robotic arm and robotic actuator used to close the cover or door, if present, is then directed to move along the calculated path and return to its home position (blocks 602-604). When finished, the system state is set to the departing state (block 605).

Figure 7:
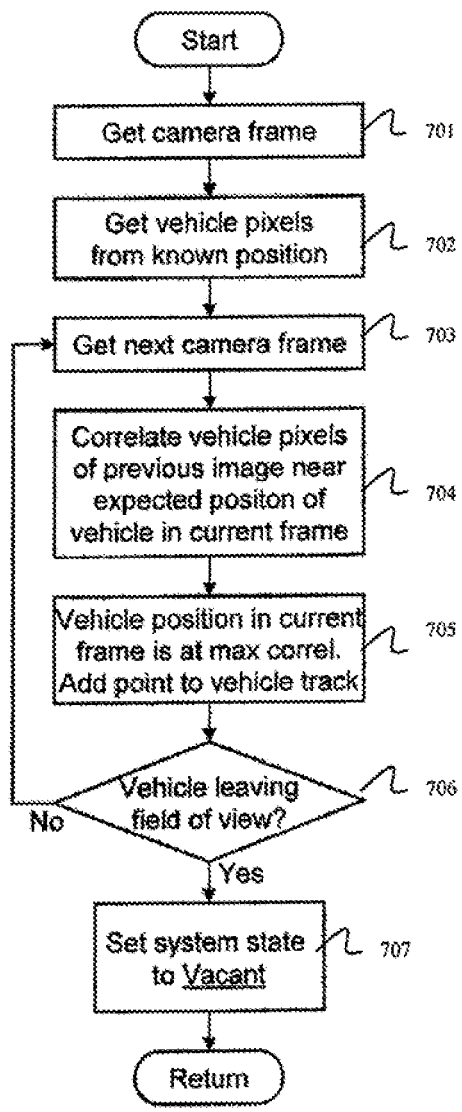
FIG. 7 is a flowchart showing the operation of a departing state software module, according to an exemplary embodiment.

FIG. 7 is a flowchart showing the operation of the departing state software module, according to an exemplary embodiment.

In the departing state, the vehicle is tracked as it moves away from the charging station. Once the vehicle has left the charging station, the system state is set to the vacant state.

Referring to FIG. 7, a camera frame is obtained (block 701). The pixels corresponding to the vehicle are obtained based on the known position of the vehicle (block 702). The next camera frame is then obtained (703), and the charging system continues to track the vehicle trajectory using a cross-correlation of the vehicle image from one frame to the next (blocks 704,705). The estimation of the position of the vehicle in the second frame results in an efficient search. It is then determined whether the vehicle is leaving the field of view (block 706). If the vehicle is not leaving the field of view, the tracking of the vehicle continues (blocks 703-705). If the vehicle is leaving the field of view, the system state is set to the vacant state (block 707).

In an exemplary embodiment, a database including information about various vehicles may be maintained and used with the charging system. The information may be stored, for example, based on the make, model and year of each vehicle, and may include a 3D model of the vehicle and information about the vehicle's charging port. The 3D model mathematically describes the shape of the vehicle and the location and characteristics of key features that may be used to identify the make, model and year of the vehicle. For example, key features may include, but are not limited to, windows, doors, lights, handles and/or bumpers on the vehicle. The 3D models may be represented using a vehicle-based coordinate system, which may be translated to coordinates based on the charging station once the position and pose of the vehicle are determined. Information stored in the database relating to the vehicle's charging port may include, but is not limited to, the position and pose of the charging port on the vehicle, as well as the type of coupling, the connector type, the direction from which the connector is inserted, the presence of a cover or door and how it is opened, the charging voltages and currents for normal and fast charging, and any connection protocols and/or signal wires that apply to the vehicle. The database may be created and maintained on a remote computer. The data in the database may initially be preloaded in the charging system, and the charging system may periodically check for updates via the communication link and automatically download and install the updates.

Figure 8:
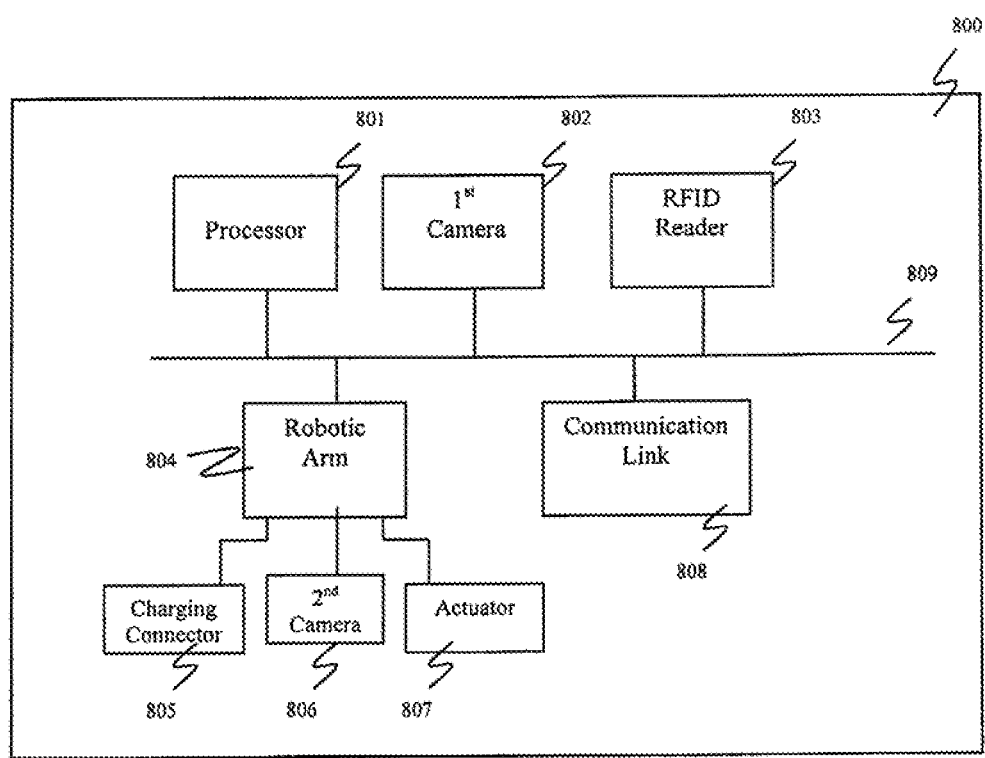
FIG. 8 is a block diagram of the vehicle charging system, according to an exemplary embodiment.

FIG. 8 is a block diagram of the vehicle charging system, according to an exemplary embodiment.

Referring to FIG. 8, an exemplary embodiment of the vehicle charging system 800 includes a processor 802, a first camera 802, an RFID reader 803, a robotic arm 804 including a charging connector 805, a second camera 806 and an actuator 807, and a communication link 808 connected to a data bus 809. The processor 801 may be used to implement the computer vision software techniques described above. The first camera 802 may acquire a plurality of images of a field of view. The RFID reader 803 may receive customer billing information from an RFID tag mounted on the vehicle and transmit the customer billing information to a remote billing system. The robotic arm 804 may automatically engage the charging connector 805 into a charging port of a vehicle. The actuator 807 disposed on the robotic arm 804 may open a door covering the charging port of the vehicle prior to engaging the charging connector 805 into the charging port, and close the door upon disengaging the charging connector 805 from the charging port. The second camera 806 disposed on the robotic arm 804 may acquire an additional plurality of images having a viewpoint different from the plurality of images of the field of view. The additional plurality of images includes a view of the charging connector 805 and the charging port. The communication link 808 may check for and download updates to a database of the vehicle charging system 800.

Figure 9:
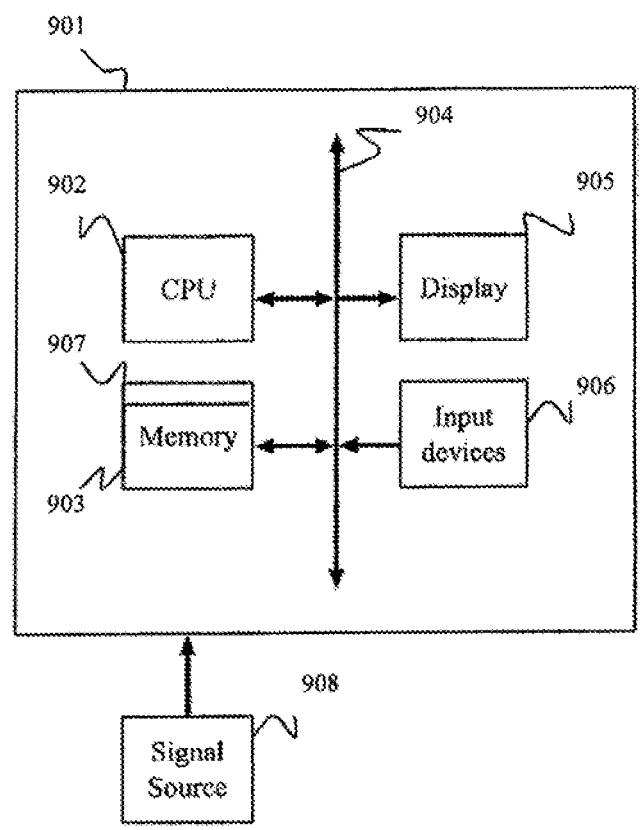
FIG. 9 is a computer system for implementing a method of automatically charging an electric vehicle, according to an exemplary embodiment of the present disclosure.

Referring to FIG. 9, according to an exemplary embodiment of the present disclosure, a computer system 901 for automatically charging an electric vehicle can comprise, inter alia, a central processing unit (CPU) 902, a memory 903 and an input/output (I/O) interface 904. The computer system 901 is generally coupled through the I/O interface 904 to a display 905 and various input devices 906 such as a mouse and keyboard. The support circuits can include circuits such as cache, power supplies, clock circuits, and a communications bus. The memory 903 can include random access memory (RAM), read only memory (ROM), disk drive, tape drive, etc., or a combination thereof. Exemplary embodiments of present disclosure may be implemented as a routine 907 stored in memory 903 (e.g., a non-transitory computer-readable storage medium) and executed by the CPU 902 to process the signal from the signal source 908. As such, the computer system 901 is a general-purpose computer system that becomes a specific purpose computer system when executing the routine 907 of the present disclosure.

The computer platform 901 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described exemplary embodiments for an automated electrical vehicle charging system and method, it is noted that modifications and variations can be made by persons skilled in the art in light of the above teachings. It is therefore to be understood that changes may be made in exemplary embodiments of the disclosure, which are within the scope and spirit of the disclosure as defined by the appended claims. Having thus described exemplary embodiments of the disclosure with the details and particularity required by the patent laws, what is claimed and desired protected by Letters Patent is set forth in the appended claims.

What is claimed is:

1. A system for charging an electric vehicle, comprising:
a radio-frequency identification (RFID) reader configured to read an RFID tag mounted on the electric vehicle;
an electronic database;
a processor configured to identify vehicle information corresponding to the electric vehicle using data read from the RFID tag by the RFID reader, and retrieve from the electronic database a location of a charging port on the electric vehicle based on the vehicle information;
a first camera configured to acquire an electronic image of the electric vehicle; and
a robotic arm configured to move a charging connector to engage the charging port of the electric vehicle to charge a battery based on the retrieved location,
wherein the processor is configured to identify the vehicle information corresponding to the electric vehicle using both the electronic image of the electric vehicle and the data read from the RFID tag,
wherein the processor is configured to identify the vehicle information by:
comparing the electronic image of the electric vehicle with a plurality of vehicle model candidates stored in the electronic database;
calculating a similarity measurement for each of the vehicle model candidates stored in the electronic database; and
selecting a vehicle model candidate having a highest similarity measurement, wherein the vehicle information is identified using the selected vehicle model candidate.

2. The system of claim 1, wherein:
the first camera is configured to acquire a plurality of images of a field of view; and
the processor is configured to:
determine whether the electric vehicle has entered the field of view based on an analysis of the plurality of images;
extract a plurality of features of the electric vehicle from each image; and
track a position and pose of the electric vehicle while the electric vehicle is in motion using the extracted features.

3. The system of claim 2, further comprising:
a second camera disposed on the robotic arm and configured to acquire an additional plurality of images, wherein the additional plurality of images has a viewpoint different from the plurality of images of the field of view and includes the charging connector and the charging port, and is used to verify the location of the charging port on the electric vehicle and guide the charging connector towards the charging port.

4. The system of claim 1, wherein:
the first camera is configured to acquire a plurality of images of a field of view; and
the processor is configured to:
determine whether the electric vehicle has entered the field of view based on an analysis of the plurality of images;
extract a plurality of features of the electric vehicle from each image; and
verify the location of the charging port on the electric vehicle and guide the charging connector towards the charging port by tracking a position and pose of the electric vehicle while the electric vehicle is in motion using the extracted features.

5. The system of claim 1, further comprising:
an actuator disposed on the robotic arm and configured to open a door covering the charging port on the electric vehicle prior to engaging the charging connector into the charging port, and close the door covering the charging port upon disengaging the charging connector from the charging port.

6. The system of claim 1, wherein the RFID reader is configured to read customer billing information from the RFID tag.

7. The system of claim 6, further comprising:
a communication link configured to transmit the customer billing information read from the RFID tag to a remote billing system.

8. The system of claim 1, further comprising:
a communication device configured to facilitate wireless communication between the system and another computing device.

9. The system of claim 8, wherein the communication device and the another computing device communicate with each other via an Internet connection.

10. The system of claim 1, wherein the RFID tag is mounted on a door of the charging port of the electric vehicle.

11. A method of charging an electric vehicle, comprising:
reading a radio-frequency identification (RFID) tag mounted on the electric vehicle;
identifying vehicle information corresponding to the electric vehicle using data read from the RFID tag;
retrieving from an electronic database a location of a charging port on the electric vehicle based on the vehicle information;
robotically moving a charging connector to engage the charging port of the electric vehicle to charge a battery based on the retrieved location; and
acquiring an electronic image of the electric vehicle,
wherein the vehicle information corresponding to the electric vehicle is identified using both the electronic image of the vehicle and the data read from the RFID tag,
wherein identifying the vehicle information comprises:
comparing the electronic image of the electric vehicle with a plurality of vehicle model candidates stored in the electronic database;
calculating a similarity measurement for each of the vehicle model candidates stored in the electronic database; and
selecting a vehicle model candidate having a highest similarity measurement, wherein the vehicle information is identified using the selected vehicle model candidate.

12. The method of claim 11, further comprising:
acquiring a plurality of images of a field of view;
determining whether the electric vehicle has entered the field of view based on an analysis of the plurality of images;
extracting a plurality of features of the electric vehicle from each image; and
tracking a position and pose of the electric vehicle while the electric vehicle is in motion using the extracted features.

13. The method of claim 12, further comprising:
acquiring an additional plurality of images,
wherein the additional plurality of images has a viewpoint different from the plurality of images of the field of view and includes the charging connector and the charging port, and is used to verify the location of the charging port on the electric vehicle and guide the charging connector towards the charging port.

14. The method of claim 11, further comprising:
acquiring a plurality of images of a field of view;
determining whether the electric vehicle has entered the field of view based on an analysis of the plurality of images;
extracting a plurality of features of the electric vehicle from each image; and
verifying the location of the charging port on the electric vehicle and guiding the charging connector towards the charging port by tracking a position and pose of the electric vehicle while the electric vehicle is in motion using the extracted features.

15. The method of claim 11, further comprising:
robotically disengaging the charging connector from the charging port on the electric vehicle.

16. The method of claim 11, further comprising:
robotically removing a door covering the charging port on the electric vehicle prior to engaging the charging connector into the charging port; and
robotically covering the charging port with the door subsequent to disengaging the charging connector from the charging port.

17. The method of claim 11, further comprising:
reading customer billing information from the RFID tag.

18. The method of claim 17, further comprising:
transmitting the customer billing information read from the RFID tag to a remote billing system.

19. The method of claim 11, wherein the RFID tag is mounted on a door of the charging port of the electric vehicle.

20. The method of claim 11, further comprising:
facilitating wireless communication between the electric vehicle and another computing device via a communication device of the electric vehicle utilizing an Internet connection.

* * * * *